July 31, 1928.　　　　　　　　　　　　　　　　　　　1,679,293
C. A. DAWLEY
METER
Filed Nov. 13, 1923　　　　2 Sheets-Sheet 2

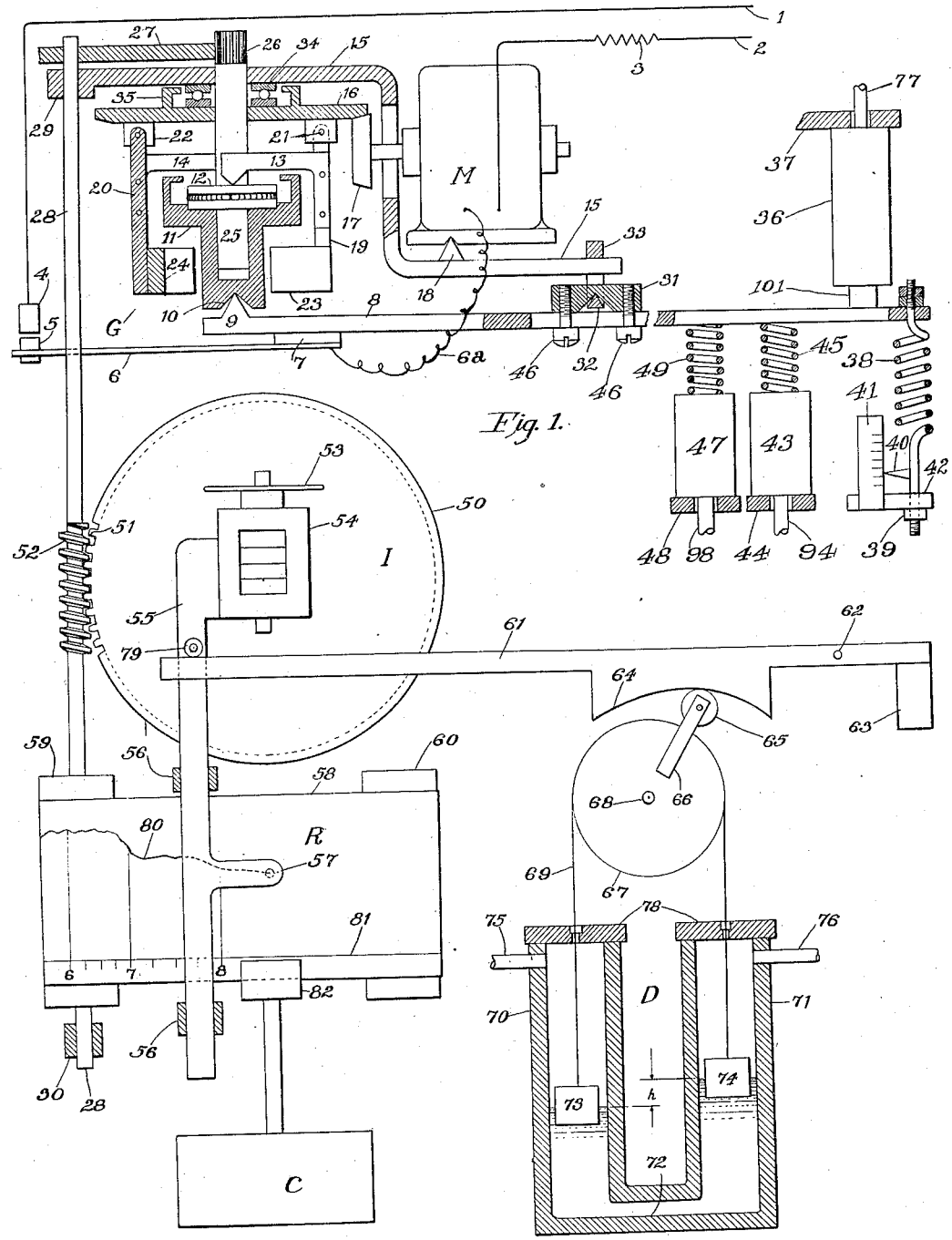

Inventor
CLARENCE A. DAWLEY
By his Attorneys

Patented July 31, 1928.

1,679,293

UNITED STATES PATENT OFFICE.

CLARENCE A. DAWLEY, OF PLAINFIELD, NEW JERSEY.

METER.

Application filed November 13, 1923. Serial No. 674,531.

My invention relates to fluid or flow meters, and more particularly to a method of and means for automatically correcting for different densities of the fluid being metered or for varying pressure, temperature, quality, composition, specific gravity, barometer, or any one or more of these conditions which may require correction of the apparent flow indicated by the meter.

The object of my invention is to provide a meter or an attachment for a meter by means of which final results may be taken from the totals shown by the integrator or from the area on a chart, without the necessity of referring to recording pressure or temperature charts, etc., and making computations to correct the readings given by the meter for the different variables affecting the density of the fluid metered. Also to permit of using a meter, which has been calibrated for one set of conditions, on fluid of other conditions without change, or with only minor changes, in adjustment. Another object of my invention is to provide means whereby the integrator and chart movement of a meter operate without clockwork and therefore continuously without winding. Further objects are pointed out in the accompanying description and claims.

My invention consists briefly in a variable speed time element or governor controlling integrator and chart movement and responsive to changes in density or other related characteristics of the fluid being measured. Other features of my invention are pointed out in the accompanying drawings, description and claims.

Fig. 1 is a schematic drawing showing my invention in connection with a gauge for determining the differential head between two points in a flow stream, means for converting this head into a motion proportional to apparent quantity flowing, means for totalizing or integrating the indicated quantity over a period of time and means for graphically recording the indicated quantity continuously;

Figure 3:
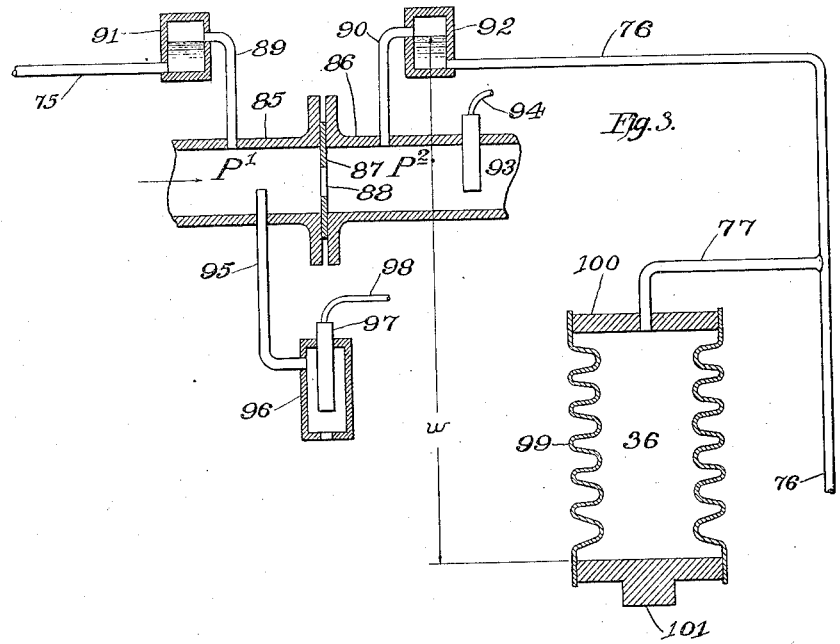
Fig. 3 shows a disc orifice held between flanges of a pipe for producing a differential head in a flow stream, together with various elements which may be used to control the speed of governor G of Fig. 1, so that this speed is a desired function of the condition of the fluid being measured.
Figure 2:
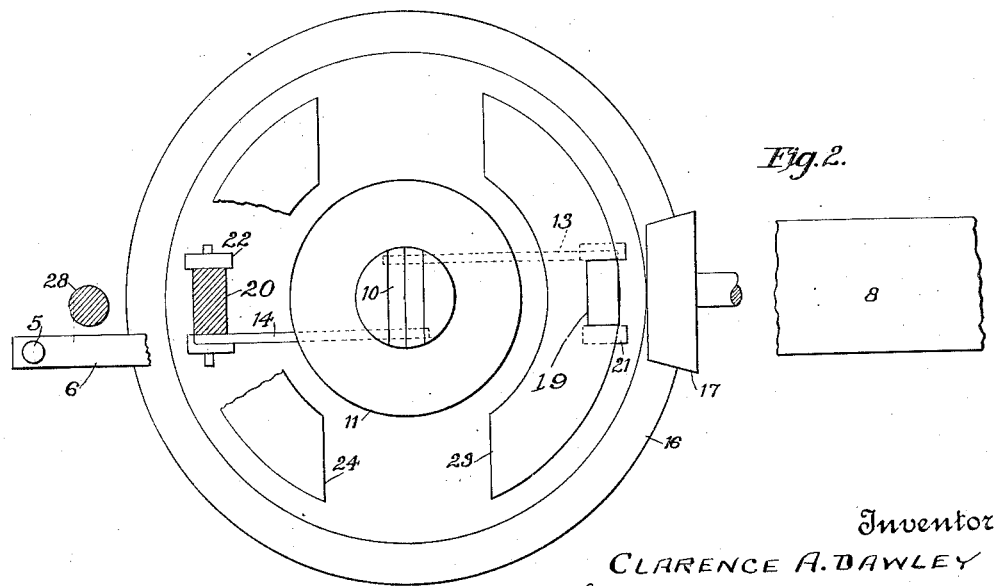
Fig. 2 is a bottom plan looking upward and showing parts of the governor G of Fig. 1.

In measuring any definite fluid of fixed density by means of a differential head established in the flow stream by a Pitot tube, Venturi tube, disc orifice, flow nozzle, or other device having similar characteristics, the head ($h$) varies as the square of the rate of flow, or the quantity Q per unit of time varies as the square root of the head, or $$Q = C x \sqrt{h}. \quad (1)$$

In this formula Q is the rate of flow in pounds per minute or other suitable units and C is a constant for any specific set of conditions. All flow meters are calibrated for some assumed density of the fluid to be measured, and if this arbitrarily assumed density is represented as unity, then at any other density ($d$) it will be necessary to multiply the apparent indications of the meter by a factor which is the square root of the relative density. The complete formula then is $$Q = C x \sqrt{h} x \sqrt{d}. \quad (2)$$

In fixed gases such as air, the density is directly proportional to the absolute pressure (gauge pressure plus barometric pressure), if the temperature remains constant, or the density varies inversely as the absolute temperature if the pressure remains constant. In condensable vapors such as steam the density varies with the pressure, but not exactly in direct proportion to the pressure. In incompressible fluids such as water the density does not vary appreciably with change in pressure, but it does vary in some definite relation with the temperature. My invention is adapted to automatically take account of variations in density, or of variations in pressure, temperature, etc., which are functions of density, and to provide a variable speed drive for the integrator and recorder of a meter, the speed of which drive is proportional to the square root of the density of the fluid being metered. The result is to apply automatically the correction factor $\sqrt{d}$ in formula (2).

Reference to the drawings and the following description will make the operation clear to those skilled in the art of metering. In Fig. 1, G is a centrifugal governor or other device having similar characteristics, M is a motor here shown as a small variable speed electric motor supplied through conductors 1 and 2 from a source of electric current. M is preferably a series wound motor adapted for use on either alternating or direct current. 3 is a resistance of any appropriate character and may consist of an electric lamp, the wattage or resistance of which may be suited to the character of the current supplied and the requirements of the motor. 4 is a stationary contact point connected to conductor 1. 5 is a movable contact point carried by spring 6 attached by insulated member 7 to lever 8. Spring 6 is connected by flexible conductor 6ª to one terminal of the motor. The other motor terminal is connected through resistance 3 to conductor 2, thus completing a circuit and furnishing energy to the motor when points 4 and 5 are in contact, and cutting off such energy from the motor when points 4 and 5 break contact. Lever 8 has near one end a knife edge 9 which rests in V groove 10 in the bottom end of the hub of housing 11. Housing 11 contains a thrust bearing 12, preferably a ball bearing whose lower ring is carried by housing 11 and whose upper ring is arranged to receive downward thrust from arms 13 and 14 of the governor. The governor together with motor M is mounted on a fixed bracket or support 15 which may be attached to the casing of the meter, not shown. The governor includes a disc 16 rotatable by friction wheel 17 on the shaft of motor M. The motor is preferably mounted on a pivot 18 at a point to one side of its center of gravity so as to furnish a constant moderate pressure of wheel 17 against disc 16.

Vertical arms 19 and 20 are pivoted to disc 16 by pins 21 passing through lugs 22 attached to disc 16. Weights 23 and 24 are carried by arms 19 and 20. Arms 13 and 14 are attached to arms 19 and 20 and the inner ends of 13 and 14 bear upon the upper ring of bearing 12. Shaft 25 is rigid with disc 16 so that the shaft revolves with the disc. The shaft passes freely through bearing 12 and has a free fit in the bore of the hub of housing 11 so that the shaft may turn freely in the housing and the housing may reciprocate freely up and down on the shaft. When the governor disc is rotated by motor M, the arms and weights rotate with it and, by virtue of the centrifugal force developed, there is a downward thrust $F^2$ of arms 13 and 14 which is transmitted through bearing 12 to housing 11 and thence to knife edge 9 of lever 8.

The centrifugal action of the governor causes an upward thrust on disc 16 in addition to the thrust of friction wheel 17. The upward thrust is carried by bearing 34 acting against bracket 15. Bearing 34 is enclosed in a casing 35 formed on disc 16 so as to carry a supply of oil for the bearing.

A similar casing formed at the top end of housing 11 carries oil for thrust bearing 12 and for the plain radial bearing of shaft 25 in housing 11. The upper end of shaft 25 has gear teeth 26 formed in it which mesh with the gear 27 mounted on shaft 28 which rotates in bearings 29 and 30 at a speed proportional to that of the governor.

Lever 8 carries block 31 with a V groove supported on knife edge pivot 32 of supporting link 33. If a definite downward force F is applied to lever 8 at a certain distance to the right from pivot 32, there will be a corresponding upward force $F^1$ at knife edge 9, opposing the downward force $F^2$ applied by arms 13 and 14. As long as these opposing forces are equal there will be no motion of lever 8, but if the downward force slightly exceeds the upward force, arms 13 and 14 will move slightly downward, depressing housing 11 and lever 8 and moving contact point 5 downward so as to partially or wholly break contact with contact point 4. This will reduce the speed of the motor and of the governor disc and weights, decrease the centrifugal force and again allow the left hand end of lever 8 to rise. This action takes place very frequently and the net result is to maintain the governor at a speed which is almost constant and is capable of developing sufficient centrifugal action to balance force $F^1$ and keep the lever 8 in a state of equilibrium. From the well known law of centrifugal motion, the outward pull of the weights, arms, etc., is proportional to the square of the speed of rotation. The downward force $F^2$ is then also proportioned to the square of the speed of governor. If the force $F'$, acting upward from the left hand end of lever 8, is caused to be proportional to the density of the fluid being metered, it is evident that the speed of the governor will be held at such a value that the square of the speed will vary as the density of the fluid or the speed itself will vary as the square root of the density. We can therefore insert the speed of the governor, or some other speed proportional to it, in formula (2) in place of the factor $\sqrt{d}$ after making suitable change in the value of constant C. This is practically a mechanical or dynamic method of obtaining a factor proportional to the square root of the density of a fluid.

The introduction of this variable speed factor into the results given by the meter may be shown by further reference to Fig. 1. I represents an integrator including a circular disc 50 mounted so as to rotate about its center as an axis. Teeth 51 in the rim of disc 50 mesh with a thread or worm 52 formed on shaft 28 so that the disc is rotated at a speed proportional to shaft 28 or to governor G. 53 is a friction wheel set at right angles to disc 50 and mounted on the shaft of counter 54 so that the counter registers the rotations of wheel 53. Counter and wheel are carried by guide 55 which has an up and down motion in bearings 56. Upward motion of guide 55 moves wheel 53 radially out on disc 50.

R represents the recorder or curve drawing element of the meter. Marking means 57, which may be a pen or stylus mounted on guide 55, travel across the width of chart 58 consisting of a paper tape which is wound off from reel 60 and over drum 59. The latter is driven by shaft 28 so that the linear travel of the tape is proportional to the speed of the governor. D represents diagrammatically a differential gauge which comprises one of the elements of a flow meter. Cylinders 70 and 71, closed at the top by covers 78 and connected at the bottom by passage 72, are partly filled with mercury. Iron floats 73 and 74 rest on the mercury surfaces. Pressures $P^1$ and $P^2$, from a head producing device such as shown in Fig. 3, are brought to cylinders 70 and 71 by pipes 75 and 76. The head is shown as $h$, the difference in elevation of the mercury surfaces. Motion of the floats is transmitted by wire 69 passing through stuffing boxes in the heads 78. This wire passes over and is fast to sheave 67, carried on axis 68. As float position changes, sheave 67 turns through an angle carrying arm 66 and roller 65. The latter works on cam surface 64 of lever 61. 61 is pivoted at 62 and has counterweight 63. Lever 61 acts on pin 79 to move guide 55 up and down. With proper proportions this will position wheel 53 on disc 50 so that the radial distance from center of disc 50 to point of contact of wheel 53 will vary with the square root of $h$. The rotation of wheel 53 shown on counter 54 is proportional to the product of the radial distance just mentioned, and the rate of rotation of disc 50. The latter is proportional to governor speed which is proportional to square root of density. The readings from counter 54 therefore include both of the variable factors of formula (2) and show the quantity of flow automatically corrected for density of the fluid being measured.

Similarly the flow may be determined by integrating the area between curve 80 and base line 81 for any known time interval. The ordinates from base line to curve 80 represent the apparent flow or the factor $\sqrt{h}$ in formula (2). The travel of the tape 58, as previously explained, is proportional to the square root of the density of the fluid being measured. The product of the mean ordinate and the distance travelled by the tape in any known time interval is the area bounded by curve 80, base line 81 and the corresponding time ordinates. This area therefore includes both of the variable factors of formula (2) and represents the quantity of flow automatically corrected for density of the fluid being measured. It is convenient although not essential to have the time indicated on the chart at intervals of 10 or 15 minutes. This may be done as is shown diagrammatically by a time clock C which turns a figure wheel 82 and depresses it at intervals to make a mark or a figure representing time, on the chart directly under the point where pen 57 is located. Time marks are indicated on the chart between 6 and 8 o'clock. The apparent flow shown by curve 80 is greater from 6 to 7 than that from 7 to 8, but the density of the metered fluid was much greater during the second hour as is shown by the greater longitudinal travel of the chart. The area representing corrected flow during the second hour is greater than during the first. An ordinary flow meter chart without the variable speed governor would give indication directly opposite to the facts under these conditions.

I do not limit my invention to any particular method of obtaining force $F^1$ which acts against the governor, but will indicate some possible methods. In Fig. 3, 85 and 86 show two flanged sections of a pipe in which a fluid, steam for example, is flowing in the direction shown by the arrow. A disc 87 with orifice 88 causes a drop in pressure from $P^1$ to $P^2$. Pipes 89 and 90 communicate pressures $P^1$ and $P^2$ to reservoirs 91 and 92 respectively. Pipes 75 and 76 carry corresponding pressures to cylinders 70 and 71 of Fig. 1. In measuring steam the pipes 75 and 76 will be filled with condensed steam or water. Reservoirs 91 and 92 contain water at the same level so that the head produced by the columns of water in pipes 75 and 76 is the same and therefore the head $h$ correctly represents the difference between pressures $P^1$ and $P^2$. 36 is a device for receiving pressure. It may be a cylinder and piston, but I have shown it as a longitudinally expansible member consisting of a corrugated metal bellows 99 with upper head 100 and lower head 101. Such devices are well known to the trade under the name "sylphons". Pressure is brought from pipe 76 by pipe 77 to the interior of the sylphon so that the pressure acting downward on head 101 is equal to pressure $P^2$ plus the pressure equivalent to the column of water of height $w$ as shown in Fig. 3. The sylphon is mounted on support 37 of Fig. 1 and with head 101 bearing upon lever 8, so that pressure acting on head 101 applies a corresponding force to the lever. A spring 38 may also be attached to lever 8 and may have its tension adjusted by nut 39, bearing on support 42, said tension being indicated by pointer 40 on scale 41. Assume first that the meter is measuring compressed air. The density varies directly with the absolute pressure. There would in this case be no water in pipes 76 and 77 and the only pressure acting on head 101 would be the gauge pressure of the air at P². If we now adjust the tension of spring 38 so that it applies a downward pull to lever 8 equivalent to an added pressure in sylphon 36 equal to the barometric pressure of the air surrounding the sylphon, the net result will be the same as if the absolute pressure of the compressed air acted on head 101. The upward force F¹ acting on the governor is therefore proportional to the absolute pressure and to the density of the air being measured, and the speed of the governor will be in proportion to the square root of the density as required.

In measuring steam the density does not vary in direct proportion to either the gauge pressure or the absolute pressure, but I have found that over a considerable range of pressure, for example from 100 to 200 pounds per square inch, the density is very closely proportional to the gauge pressure plus an arbitrary amount somewhat less than the barometric pressure. In measuring steam, the water column $w$ and the gauge pressure P² act on head 101 and if the water column is of suitable height, it may take the place of spring 38. If the water column is not enough the spring may be used to add the required downward pull, or if the water column is too much the spring may be made to act upward as needed. The net result is to apply an upward force F¹ to the governor, which force is proportional to the density of the steam flowing in pipe 85—86 and which will cause the governor to run at a speed proportional to the square root of the density as required.

I have so far assumed that the lever 8 and the weight of housing 11, bearing 12, etc., are in balance before any forces are applied to the lever, but if this is not the case it is evident that spring 38 may also be used to apply a tension to produce a gravity balance in the lever system before any other forces are applied. It is evident from the above that we may, by use of sylphon 36 and spring 38, apply a force for the governor to act against, which will give a governor speed proportional to the square root of the density either for a vapor like steam or a fixed gas like air, in so far as the density is determined by the gauge pressure of the fluid and the barometric pressure at which the meter is used. If the meter is used on a fixed gas, the scale 41 may be graduated in terms of barometric reading. If for use on steam or other condensable vapors, the scale may be graduated in terms of the normal or average gauge pressure P², so that if a wide change is made in the pressure, for example by changing the meter from a 200 pound system to a low pressure heating system, a suitable change can be made in the force modifying the force applied by the gauge pressure. The actual tension of spring 38 takes account of height of water column $w$, normal barometric pressure where meter is to be used, gravity balancing of the lever system and the normal gauge pressure of the steam being measured.

When measuring liquids with the meter, the spring 38 may be used without pressure element 36, and the scale 41 may be graduated in terms of the specific gravity or density of the liquid being metered. Obviously the tension of spring 38 might be regulated automatically instead of adjusted manually by nut 39. An instrument giving readings of density direct might be used to control the application of down forces on lever 8 regardless of whether changes in density were due to pressure, barometer, temperature or any other cause.

For use in connection with 36 and 38, or either of them, I have indicated a device for correcting for temperature. Fluids generally expand with rise of temperature and the density decreases. A thermometer bulb 93 is inserted in pipe 86 and coupled by capillary tubing 94 to device 43 (which may be constructed similarly to sylphon 36). One end of 43 is fixed to support 44, and the free or upper end acts through spring 45 to apply an upward force to lever 8. This opposes the other forces acting against the governor and causes a slowing down of the governor, with proper proportions that may be made to correct for the change in density due to temperature.

In Fig. 3, 96 may be a throttling calorimeter and 95 a pipe which takes a sample of steam from pipe 85. Steam containing condensed moisture will pass through a disc orifice without the pressure drop being affected very much (if at all) by the weight of the water carried by the steam. If it is desired to obtain the weight of the mixture, including both the steam and the water, it is necessary to increase the reading of the meter when quality of steam is low, or to decrease the reading of the meter when quality is high. Thermometer 97 forming a part of the throttling calorimeter will show higher temperatures when the quality is high. Capillary tube 98 connects thermometer to device 47, similar to device 43, fixed to support 48 and acting through spring 49 on the lever 8. When quality of steam is high the upward force of spring 49 on lever 8 is increased, thus reducing the total force acting against the governor and slowing down the speed of the governor as is required.

I have shown the pivot point of lever 8 as a V block 31 which is attached to the lever by screws 46, which pass through a slot in the lever so that the position of the block may be shifted, thus changing the leverage. By this means a meter which was originally intended for a low differential may be changed by adjustment of this leverage so that it will be suited to a high differential, or vice versa. For convenience of illustration I have shown devices 36, 38, 43 and 47 as being located at different distances from the pivot point. They may however all be made to act at the same distance from the pivot; then, if the pivot is moved along the only other change necessary will be to change the tension of spring 38 so as to maintain the gravity balance of lever 8, housing 11, etc., when other forces are not acting on the lever.

To meet varying conditions of service, many modifications may be made in the means for applying forces to oppose the centrifugal action of the governor. I do not limit myself to the means shown, but what I claim is—

1. In a flow meter for variable density fluids, a register element, means for imparting bodily movement thereto responsive to the differential pressure due to flow, a register operating element actuable in accordance with the density of the fluid metered, and means for operating said register operating element, said means comprising a variable speed rotor, and means governing said rotor, said means including a displaceable element, means whereby said element is displaced responsive to density of the flowing fluid, an opposed element, means whereby said element is rendered responsive to the speed of the rotor, said opposed elements serving to establish a balance at a speed of rotation determined by the density of the metered fluid.

2. In a fluid meter, differential head producing means, a displaceable member, means responsive to the differential head and tending to displace said member, a driving member on which said member is displaceably mounted, in combination with a motor, means operated by said motor to produce a force and means rendering said force proportional to the square of the speed of said motor operated means, together with means for producing and applying, in opposition to said force, a second force, means rendering said second force proportional to the density of the metered fluid, means controlling the speed of the motor-operated means to maintain the opposing forces in balance, together with fixed-ratio transmitting means operatively interposed between said motor operated means and said driving member.

3. In a flow meter for variable density fluids, a displaceable member, means under the influence of the fluid density and tending to displace said member, a member displaceably opposed to said first named member, a motor, a centrifugal member driven by the motor and operatively connected to said displaceably opposed member, and means governed by the displacement of the latter for controlling the motor speed.

In testimony whereof I have signed my name to this specification.

CLARENCE A. DAWLEY.